Dec. 3, 1963  C. J. BOYER  3,112,745
AIR SUPPLY ATTACHMENT FOR WELDING HELMET
Filed May 11, 1961
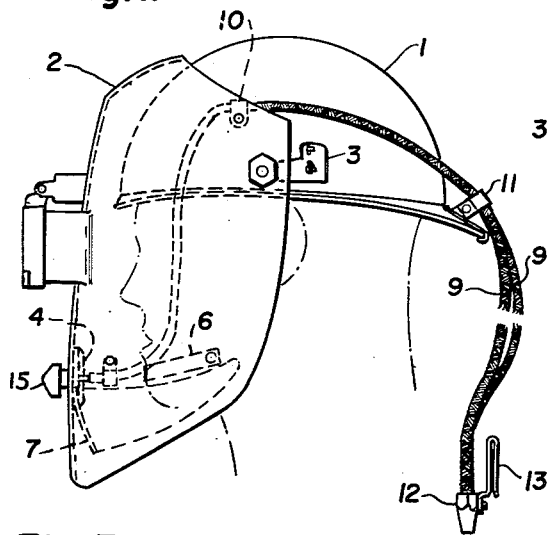
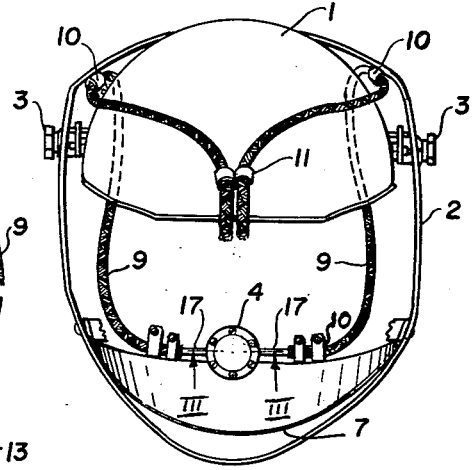
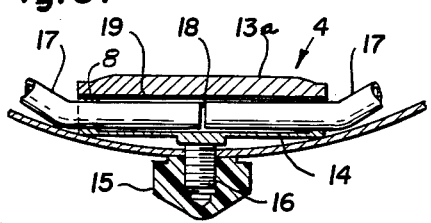
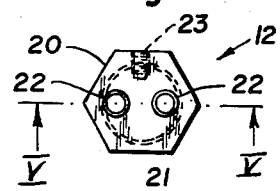
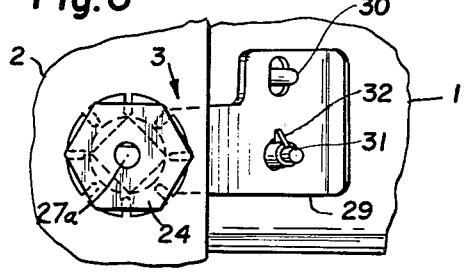
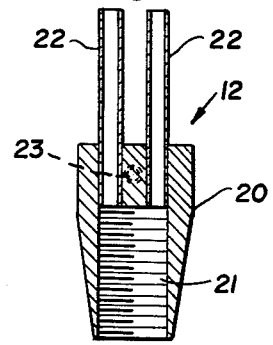
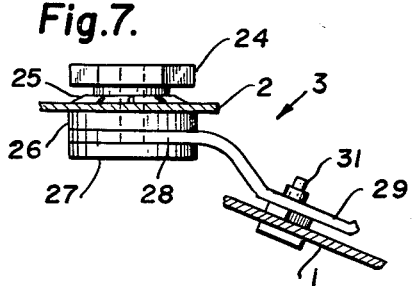
INVENTOR.
CHARLES J. BOYER
BY
his ATTORNEY

United States Patent Office 3,112,745
Patented Dec. 3, 1963

3,112,745
AIR SUPPLY ATTACHMENT FOR WELDING HELMET
Charles J. Boyer, West Reading, Pa., assignor to The Electric Storage Battery Company, Philadelphia, Pa., a corporation of Pennsylvania
Filed May 11, 1961, Ser. No. 110,311
1 Claim. (Cl. 128—142)

This invention relates to a welding helmet assembly and, more particularly, relates to a fresh air supply attachment which may be detachably connected to a safety cap and which distributes fresh air which prevents foul air from entering the shield, but without the usual disturbing hissing noise that accompanies conventional air supply systems.

In the past, air from an uncontaminated source under pressure has been introduced within the interior of welding helmets to provide a supply of fresh air for breathing purposes and to prevent inhalation of noxious or toxic fumes occurring, for example, in the welding or cutting of brass, zinc or galvanized iron or metal coated with lead paint.

An outstanding disadvantage of such systems is that they cannot be used with or attached to conventional safety caps or suspensions but, instead, the entire assembly is usually built as a special headgear which requires a specially constructed suspension and cap.

Another outstanding disadvantage of conventional air supply systems for welding shields is that the flow of air in a particular direction within the shield provides a disturbing draft on the head of the wearer and makes a very disturbing hissing sound which is extremely annoying to the wearer. While attempts have been made to muffle such hissing sounds by insertion of sound deadening materials within the helmet shell, they have not been successful since the hiss can still be heard and is still annoying.

An object of the present invention is to provide a welding helmet or shield with an air supply system which is devoid of the above named disadvantages and which may be easily and quickly attached to or detached from any standard safety cap, thus eliminating the necessity of providing a special or built-in cap or suspension; also which includes relatively simple and inexpensive parts.

Another object of the present invention is to provide a novel plenum chamber in an air supply system for welding helmets which will not only provide more uniform distribution of the air without drafts, but which will completely eliminate the usual disturbing hiss accompanying conventional fresh air supply systems for welding helmets.

Other objects and advantages will become more apparent from a study of the following description taken with the accompanying drawing wherein:

FIG. 1 is a side elevational view of a welding helmet and safety cap assembly including an air supply attachment and assembly embodying the features of the present invention;

FIG. 2 is a rear elevational view of the assembly shown in FIG. 1;

FIG. 3 is an enlarged, cross sectional view of the plenum chamber 4 taken along line III—III of FIG. 2;

FIG. 4 is a top, enlarged, view of the terminal connection 12 shown in FIG. 1;

FIG. 5 is a vertical, cross-sectional view taken along line V—V of FIG. 4;

FIG. 6 is an enlarged, fragmentary view of the pivotal connection between the welding shield and bracket 3 detachably connected to the safety cap 1; and FIG. 7 is an enlarged top view, partly in cross-section, of the assembly shown in FIG. 6.

Referring more particularly to FIGS. 1 and 2 of the drawing, numeral 1 denotes a safety cap or any well known construction and of any well known material, such as plastic or metal, such as aluminum. A welding helmet or shield 2 is provided for shielding the face of the wearer against welding arcs and the like.

Welding helmet 2 is pivotally mounted on a substantially L-shaped, detachable bracket 3 by means of a spring washer 25 and a plastic nut 24, as shown more clearly in FIGS. 6 and 7. Thus by slightly unscrewing the nut 24 so as to relieve the pressure on the spring washer 25, the welding shield 2 may be pivotally moved with respect to bracket 3. The forward arm 28 of the bracket 3 is sandwiched between washer 26 and bolt 27, the latter having an integral threaded shank 27a extending through registering holes in washer 26, helmet 2, spring washer 25 and nut 24. The other arm of bracket 3, namely 29, has a pair of holes, through which are adapted to project a pin 30 and cinch fastener 31 rigidly mounted on each side of the cap 1 as an integral unit. The friction between such arm 28 and helmet 2 is increased by screwing nut 24 more tightly on the shank. Washer 26 has a square shaped projection or hub (see FIG. 6) which fits into a correspondingly shaped hole in helmet 2 to prevent relative rotation. The threaded shank has a flattened side fitting into a correspondingly shaped hole in washer 26 to prevent relative rotation therebetween. Parts 24, 26 and 27 are preferably of plastic material. The brackets 3 are sprung apart by virtue of the slight flexibility of helmet 2 and moved into registry with pins 30 and cinch fasteners 31, whereupon the spring biased cinch fastener elements 32 are urged radially outwardly so as to provide a latch for preventing outward movement of bracket 3 relative to cap 1.

An important feature of the invention resides in the construction of the plenum chamber shown in FIG. 3 and generally denoted by numeral 4. This chamber comprises a cylindrical, cup shaped element 14, preferably having an inner diameter of 1.625 inches, a height of .25 inch and having an integral threaded shank 16 which projects outwardly through a hole in shield 2 and which is screw threaded into an internally threaded portion of a plastic knob or head 15 which, upon tightening firmly holds the plenum chamber in place within helmet 2. The lid 13a is spaced from cup 14 by a plurality of peripherally disposed adjusting screws 8 for providing a gap of .15 inch through which air is discharged radially outwardly. Two pieces of brass tubing 17, having an inner diameter of .156 inch, are led through diametrically opposite holes formed in element 14. The confronting ends of tubes 17 are spaced by a gap 18 having a width of .003 inch. The dimensions of the plenum chamber, particularly that of gap 18, are rather critical for the purpose of deadening the hissing sound. Also uniform distribution of fresh air radially outwardly of the plenum chamber is obtained which eliminates drafts. Air under pressure is led into tubes 17 by means of flexible hoses or tubes 9, of rubber or other suitable material, the other ends of which are connected to brass tubes 22 integrally extending from a plug which is held, by set screw 23, within a connector 20 internally threaded at 21 and thus forming a connector 12 which may be connected to a source of fresh-air under pressure (not shown). A clip 13 is attached to connector 12 and may be clipped to the belt of the wearer. Pairs of clamps 10 and 11, rigidly connected to helmet 2, are for holding portions of the flexible hoses 9 in proper position, as shown in FIGS. 1 and 2. Spring clip 11 which is detachably connected to the rear brim portion of the cap clamps hoses 9 together and leads them down in spaced relationship with the back of the wearer.

A shield 7, preferably of the same material as helmet 2, is provided opposite the chin of the wearer. The top edge of the shield is rigidly secured to helmet 2. The shield is flared relative the helmet for the purpose of deflecting the air emanating from gap 18 so that it will be directed towards the face of the wearer and uniformly distributed without causing a draft.

It will be seen from the above described construction, that the air supply attachment is detachably connected to the interior of the welding helmet and the resulting assembly may be used in connection with any standard cap 1, without the necessity of purchasing a new cap which is specially constructed for the assembly.

It will be further noted that the air supply system not only provides a copious supply of fresh air under pressure, sufficient to prevent entry of noxious or toxic fumes into the interior of the welding shield, but will entirely prevent a hissing sound or noise that would cause annoyance to the wearer.

Thus it will be seen that I have provided an efficient air supply attachment for a welding helmet which is readily adapted for use in connection with any standard safety cap, to which it may be easily and quickly detachably connected, and which includes a plenum chamber which not only uniformly distributes the fresh air without causing drafts within the helmet shell, but which will completely eliminate the hissing sound which is attendant conventional air supply systems; furthermore, I have provided an air supply attachment for a welding helmet which comprises relatively few, inexpensive and simple parts, therefore which can be manufactured very cheaply.

While I have illustrated and described a single specific embodiment of my invention, it will be understood that this is by way of illustration only, and that various changes and modifications may be made within the contemplation of my invention and within the scope of the following claim.

I claim:

In combination with a welding helmet, a connector adapted to be connected to a source of air under pressure, a pair of hoses connected to said connector, a cylindrical cup shaped plenum container mounted on the lower interior surface of said helmet in confronting relationship with the lower face portion of the wearer, a pair of air inlet ducts, each connected to the free end of one of said pair of hoses, said ducts extending radially inwardly through diametrically opposite side wall portions of said container which side wall portions extend away from said interior surface, the ends of said ducts being in confronting relationship and separated by a sufficiently small gap, of the order of .003 inch, to deaden the noise of the air stream, a circular lid overlying the mouth portion of said cup shaped container and spaced therefrom by a small gap forming the sole exit through which fresh air emanates from said container so as to be uniformly distributed radially outwardly of the container along the interior of, and throughout the lower interior space of said helmet, whereby air drafts are avoided.

References Cited in the file of this patent

UNITED STATES PATENTS

| | | |
|---|---|---|
| 702,031 | Ronan | June 10, 1902 |
| 1,845,460 | Watters | Feb. 16, 1932 |
| 2,377,122 | Bakke | May 29, 1945 |
| 2,525,236 | Palmer | Oct. 10, 1950 |
| 2,577,607 | Conley | Dec. 4, 1951 |

FOREIGN PATENTS

| | | |
|---|---|---|
| 917,835 | Germany | Sept. 13, 1954 |